United States Patent
Sarratori et al.

(10) Patent No.: US 9,594,776 B2
(45) Date of Patent: Mar. 14, 2017

(54) DYNAMIC, PARAMETERIZED IMAGE RESOURCE SELECTION

(71) Applicant: Microsoft Technology Licensing, LLC, Redmond, WA (US)

(72) Inventors: Andrew W. Sarratori, Bellevue, WA (US); Jeffrey D. Robison, Redmond, WA (US); Arthur Charles Leonard, Kirkland, WA (US); Khaled Waleed Al-Sherif, Bellevue, WA (US); Matthew S. Johnson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 14/704,823

(22) Filed: May 5, 2015

(65) Prior Publication Data
US 2016/0328421 A1    Nov. 10, 2016

(51) Int. Cl.
G06K 9/54    (2006.01)
G06K 9/60    (2006.01)
G06F 17/30   (2006.01)

(52) U.S. Cl.
CPC .. *G06F 17/30271* (2013.01); *G06F 17/30598* (2013.01)

(58) Field of Classification Search
CPC ......... G06F 17/30011; G06F 17/30247; G06F 17/30265; G06F 8/38; G06T 15/005; G06T 15/04
See application file for complete search history.

(56) References Cited

U.S. PATENT DOCUMENTS

| | | | |
|---|---|---|---|
| 7,484,223 B2 | 1/2009 | Hill et al. | |
| 7,596,284 B2 | 9/2009 | Samadani | |
| 7,689,583 B2 | 3/2010 | Bozich et al. | |
| 2009/0063431 A1* | 3/2009 | Erol | G06F 17/30247 |
| 2010/0149139 A1 | 6/2010 | Kroll et al. | |

(Continued)

OTHER PUBLICATIONS

"Supporting Multiple Screens", Published on: May 14, 2011 Available at: http://developer.android.com/guide/practices/screens_support.html.

(Continued)

*Primary Examiner* — Phuoc Tran
(74) *Attorney, Agent, or Firm* — Workman Nydegger

(57) ABSTRACT

Embodiments are directed to providing an image in response to a request for an image and to requesting an image for a specified context. In one scenario, a computer system stores multiple image representations of a corresponding visual asset identified by an identifier. The image representations include a vectorized representation of the visual asset and/or a rasterized representation of the visual asset. The computer system receives a request that includes an identifier for one of the visual assets and usage parameters. The computer system evaluates at least one of the usage parameters to identify an image representation of the identified visual asset that substantially corresponds with the usage parameters. The computer system then obtains the identified image representation of the corresponding visual asset based on the evaluation and provides the obtained image representation in response to the request.

16 Claims, 4 Drawing Sheets

(56) References Cited

U.S. PATENT DOCUMENTS

| | | |
|---|---|---|
| 2011/0216210 A1 | 9/2011 | Hao |
| 2012/0084685 A1 | 4/2012 | Heynen et al. |
| 2012/0188382 A1 | 7/2012 | Morrison et al. |
| 2014/0184606 A1 | 7/2014 | de Richebourg et al. |
| 2016/0210347 A1* | 7/2016 | Meyer .............. G06F 17/30707 |

OTHER PUBLICATIONS

"Themes", Retrieved on: Feb. 6, 2015 Available at: http://developer.blackberry.com/native/documentation/cascades/ui/themes/.

"Screen Layout and Resolution", Published on: Jun. 13, 2014 Available at: https://developer.amazon.com/appsandservices/solutions/devices/kindle-fire/app-development/01--screen-layout-and-resolution.

Jose, Jason San, "Flex Mobile Skins—Part 2: Handling different Pixel Densities", Published on: Jun. 2011, Available at: http://www.adobe.com/devnet/flex/articles/mobile-skinning-part2.html.

"Supporting Multiple Resolutions in Windows 8.1 Apps", Published on: Jul. 12, 2013 Available at: https://msdn.microsoft.com/en-us/library/windows/apps/dn263244.aspx.

Smus, Boris, "High DPI Images for Variable Pixel Densities", Published on: Aug. 22, 2012 Available at: http://www.html5rocks.com/en/mobile/high-dpi/.

\* cited by examiner

DYNAMIC, PARAMETERIZED IMAGE RESOURCE SELECTION

BACKGROUND

Software applications or "apps" are ubiquitous in today's computing world. These apps are installed on phones, tablets, wearable devices, televisions and other electronic devices. Each of these electronic devices may be different in size and, as such, may have a widely different display resolution. The same apps may be installed on many different types of devices. To prepare for the differences in resolution on different devices, apps typically come pre-loaded with different icon images and other images. Then, depending on which device the app is to be displayed on, the appropriate image size is selected from the pre-loaded images.

BRIEF SUMMARY

Embodiments described herein are directed to providing an image in response to a request for an image and to requesting an image for a specified context. In one embodiment, a computer system stores multiple image representations of a corresponding visual asset identified by an identifier. The image representations include a vectorized representation of the visual asset and/or a rasterized representation of the visual asset. Some of the image representations may also include associated usage metadata. The computer system receives a request that includes an identifier for one of the visual assets, and further includes usage parameters. The computer system evaluates at least one of the usage parameters (potentially in conjunction with usage metadata) to identify an image representation of the identified visual asset that substantially corresponds with the usage parameters. The computer system then obtains the identified image representation of the corresponding visual asset based on the evaluation and provides the obtained image representation in response to the request.

In another embodiment, a computer system requests an image for a specified context. The computer system generates a request that includes an identifier for one of multiple visual assets. The request further includes usage parameters indicating characteristics of an environment in which the visual asset will be presented. The computer system transmits the generated request to an image providing service, where the image providing service is configured to store multiple image representations of the corresponding visual asset identified by the identifier. The image representations include a vectorized representation of the visual asset and/or a rasterized representation of the visual asset. Then, upon the imaging service identifying at least one image representation of the corresponding visual asset that substantially corresponds with the usage parameters, the computer system receives the identified image representation from the imaging service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
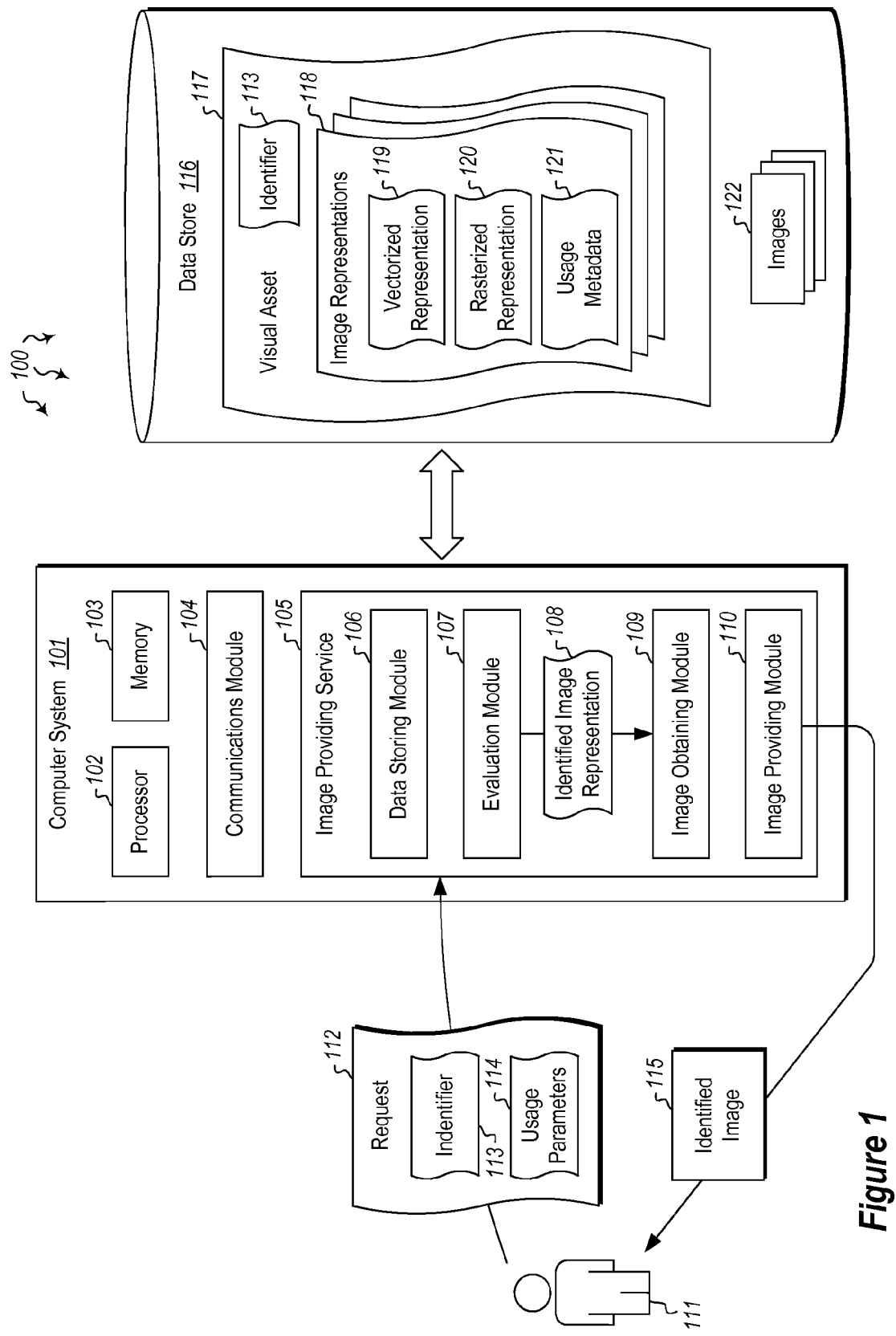
FIG. 1 illustrates a computer architecture in which embodiments described herein may operate including providing an image in response to a request for an image.

Embodiments described herein are directed to providing an image in response to a request for an image and to requesting an image for a specified context. In one embodiment, a computer system stores multiple image representations of a corresponding visual asset identified by an identifier. The image representations include a vectorized representation of the visual asset and/or a rasterized representation of the visual asset. Some of the image representations may also include associated usage metadata. The computer system receives a request that includes an identifier for one of the visual assets, and further includes usage parameters. The computer system evaluates at least one of the usage parameters (potentially in conjunction with usage metadata) to identify an image representation of the identified visual asset that substantially corresponds with the usage parameters. The computer system then obtains the identified image representation of the corresponding visual asset based on the evaluation and provides the obtained image representation in response to the request.

In another embodiment, a computer system requests an image for a specified context. The computer system generates a request that includes an identifier for one of multiple visual assets. The request further includes usage parameters indicating characteristics of an environment in which the visual asset will be presented. The computer system transmits the generated request to an image providing service, where the image providing service is configured to store multiple image representations of the corresponding visual asset identified by the identifier. The image representations include a vectorized representation of the visual asset and/or a rasterized representation of the visual asset. Then, upon the imaging service identifying at least one image representation of the corresponding visual asset that substantially corresponds with the usage parameters, the computer system receives the identified image representation from the imaging service.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible hardware processor, and a physical and tangible hardware or firmware memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media or computer-readable hardware storage devices that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network. Such communication channels may include hardware-based receivers, transmitters or transceivers, which are configured to receive data, transmit data or perform both.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments described herein also include physical and other computer-readable media for carrying or storing computer-executable instructions and/or data structures. Such computer-readable media can be any available media that can be accessed by a general-purpose or special-purpose computer system. Computer-readable media or storage devices that store computer-executable instructions and/or data structures are computer storage media or computer storage devices. Computer-readable media that carry computer-executable instructions and/or data structures are transmission media. Thus, by way of example, and not limitation, embodiments described herein may comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system further includes an image providing service 105. The image providing service may be configured to assist in selecting images for display on displays with varying pixel densities. Indeed, many applications provided in application stores are available for smart phones, tablets, wearable devices, televisions and other devices. As such, the applications typically come with different images, only a few of which are relevant to any given platform. For example, images designed for display on a wearable device will not look good when displayed on a television. Including all of the images for each platform, however, increases the overhead of the application. Still further, some images may not look good when paired with certain themes or background images. For instance, some images may not be legible or may not appear aesthetically pleasing when displayed against a light or dark background. Embodiments described herein identify images for display on displays with varying pixel densities (e.g. standard, 4k, retina, high-DPI, etc.), varying application themes and different contrast levels, while maintaining a minimal download and runtime footprint.

The image providing service 105 may be configured to perform a variety of tasks including centralizing image handling for an application or group of applications. The image providing service 105 may be configured to allow an application to select an appropriate image at runtime, store those images in vector and/or raster images and render them on the fly, theme the images appropriately to match dark and light themes, and allow for image concept overrides for special cases, such as accessible modes (e.g. high-contrast). In line with this, the image providing service 105 may include multiple modules for performing different tasks. For instance, the evaluation module 107 may be configured to evaluate image requests as they are received. The image requests (e.g. 112) may be received from user 111, or may be received from an application or from another computer system. The request 112 may include an identifier 113 and/or usage parameters 114. The identifier 113 may identify a specific image or group of images, while the usage parameters may specify how the image is to be used.

For example, an image request may come from user 111 or, more specifically, from an application running on an electronic device that the user is using such as a smart phone, tablet, watch, television or other device. The request 112 may identify a specific image or icon that is to be displayed in conjunction with or as part of the application. This image or icon is generally identified using identifier 113. At least in some cases, however, the identifier 113 may not directly identify a single image, but may identify a visual asset 117. The visual asset 117 may be a data structure that includes a plurality of different image representations 118.

These image representations 118 may be vectorized (119) or rasterized (120) representations of the visual asset 117. A vectorized representation may include any representation that uses or is based on vector graphics. Vector graphics may use mathematical equations of geometrical primitives such as lines, curves, points and shapes or polygons to represent images. Examples of vector graphics formats include SVG, EPS, and DXF. A rasterized representation may include any representation that is based on a grid of pixels or individual points of color. Rasterized representations may be defined using a bitmap where each pixel is represented by one or more bits in memory. Examples of raster graphics formats include JPEG, GIF and PNG.

Each representation 118 may be best suited for display in a certain environment (e.g. on a large display with a black background, or on a medium-sized display with a specified theme in place, or on a small display with at a specified contrast ratio). Accordingly, each visual asset may have one or many different image representations 118, each of which may be retrieved and displayed based on the request 112.

The image providing service 105 may implement an evaluation module 107 to determine, based on the identifier 113 and/or usage parameters 114 provided in the request 112, which of the image representations 118 is best suited for display. The image representation 108 identified by the evaluation module 107 is indicated to the image obtaining module 109 which requests and receives the identified image representation 108. Once the image is obtained, the image providing module 110 may provide the actual image that was obtained (i.e. image 115) to the user or to the user's electronic device.

At least in some embodiments, at runtime an application may use the identifier 113 to request an image from a store or "catalog" of images (e.g. images 122 stored in data store 116). At runtime, the application may submit usage parameters 114 when requesting the image. These usage parameters 114 may include, for example, screen dots per inch (DPI), application background color, an indication of whether high-contrast mode is selected, a desired target size, etc. At runtime, the image service 105 may then provide an image that best matches the request parameters. Here it should be noted that, although shown as being entirely within computer system 101, the image providing service 105 and its modules may be distributed over multiple computing systems. The service 105 may be a global application object or, at least in some cases, may be a local or distributed service.

When an application developer is creating or designing a software application (i.e. at "design time"), an application developer may compose a catalog of images to use at runtime. The catalog may contain multiple resources for any one image concept (i.e. the catalog may include multiple image representations 118 for any one visual asset 117). Those resources can be stored in vector (119) or raster (120) form. For example, the resources may be stored in various file types including scalable vector graphics (SVG), extensible application markup language (XAML), portable network graphics (PNG), bitmaps or other file types. The resources may have usage metadata 121 that the image providing service may use when making its evaluation for a best-fit match when an image request is received.

Multiple catalogs can be published by any number of vendors, and other users may add their own images to these catalogs. An application developer may be informed of the identifier of an image (e.g. globally unique identifier (GUID)+DWORD (or data size) combination) to request an image. In such cases, the GUID may be any sequence of symbols including numbers and letters that uniquely identify the image, while the DWORD may be an integer value that represents the size of the image. The image providing service 105 may be used in the context of a single application, in the context of an entire computing system, or in the context of an online service for image discovery and rendering. Embodiments may also be applied to web-site and mobile development within an integrated development environment (IDE). These concepts will be explained further below with regard to methods 200 and 300 of FIGS. 2 and 3, respectively.

Figure 2:
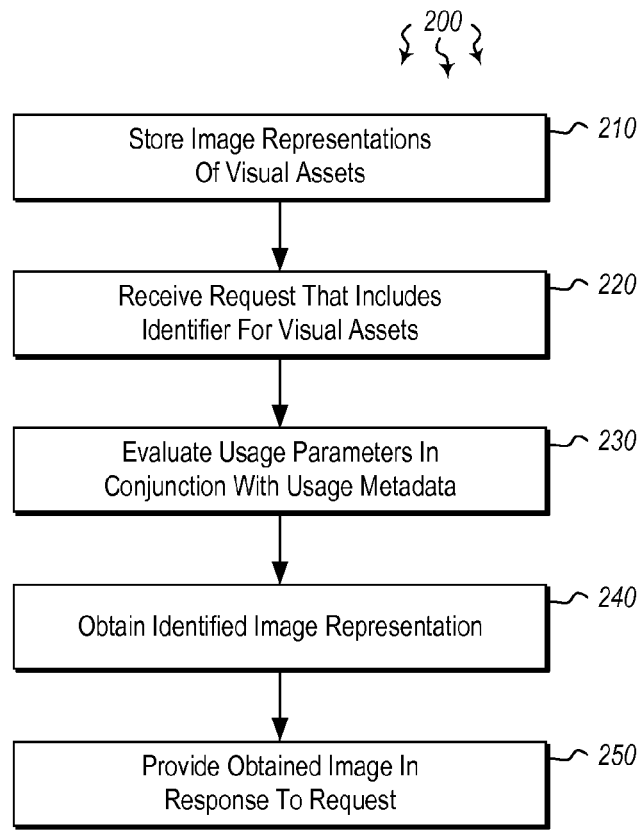
FIG. 2 illustrates a flowchart of an example method for providing an image in response to a request for an image.
Figure 3:
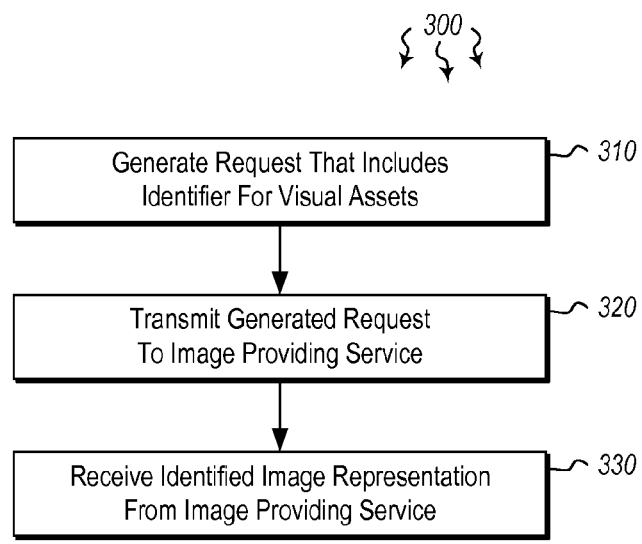
FIG. 3 illustrates a flowchart of an example method for requesting an image for a specified context.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing an image in response to a request for an image. The method 200 will now be described with frequent reference to the components and data of environment 100.

Method 200 includes, for each of a plurality of visual assets, each having an identifier, performing the following against an unknown set of visual assets: storing a plurality of image representations of the corresponding visual asset identified by the identifier, the plurality of image representations including at least a vectorized representation of the visual asset or a rasterized representation of the visual asset (210). As shown in FIG. 1, a visual asset 117 may have an identifier 113. The identifier may be unique to a single visual asset or, in some cases, may identify a group of visual assets. At least in some cases, the image representations may also include associated usage metadata 121.

The visual asset 117 has one or more image representations 118 associated with it. The image representations may be vectorized representations 119, rasterized representations 120 or other forms of image representations. The vectorized representations may include, for example, SVG images, while the rasterized representations may include PNG or bitmap images. The image providing service 105 of computer system 101 may search through an unknown set of visual assets for a given visual asset. The unknown set or catalog may include many different visual assets, some of which are provided by a developer, and some of which may be provided by outside users. The image providing service 105 may store one or more image representations 118 for each visual asset, the visual asset being identified by identifier 113. At least some of the image representations may include associated usage metadata 121. The usage metadata may indicate scenarios, settings or even specific displays that it is designed to be displayed with.

For example, a visual asset may have a vectorized representation 120 that is designed for use on large, high resolution displays such as 4k or 8k televisions. Additionally or alternatively, a visual asset may have a rasterized representation 120 that is intended for use on a much smaller display (such as a 16×16 image with low pixel density). Either of these intended uses may be captured in the usage metadata 121. Then, when the evaluation module 107 of the image providing service 105 is evaluating which image representations would best match a given request, it can look to the usage metadata for each of the image representations to get a better idea of which representation will work best.

The usage metadata may include many different kinds of data including contrast settings, size, brightness settings and pixel density information and other types of information that would be useful when determining whether a given image representation would be a good fit for certain situations. For instance, a certain image may be well suited for presentation on a certain display. In other situations, the usage metadata may be used to identify a grayed out image to represent a disabled feature, or may be used to identify other features that may be desirable in certain situations.

Figure 5:
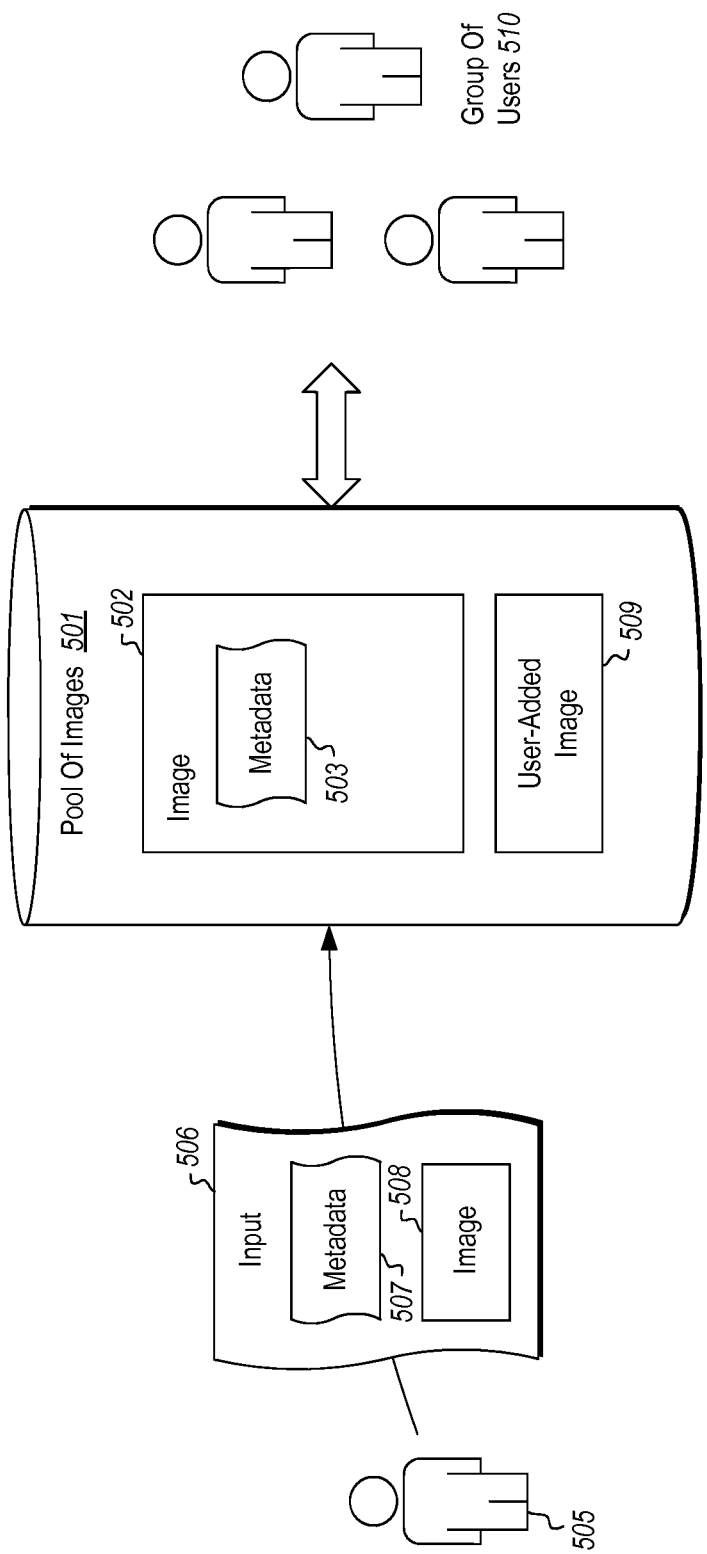
FIG. 5 illustrates an embodiment in which multiple users provide images that are added to a pool of available images.

As mentioned above, the collection of image representations may be an extensible catalog of image representations. The extensible catalog of image representations may be added at runtime when the application is run, and may be queryable by the application to determine which images should be placed in which spots. As shown in FIG. 5, an extensible catalog or "pool" of images 501 may be provided by a data store. Each image 502 in the pool may include metadata 503 (e.g. metadata provided by a developer). Typically, the user in such cases would be a developer or author of a programmatic extension to the image providing service 105, although this does not need to be the case. Th user may add images 509 to the pool of images 501 by way of an image manifest, where each new image added (e.g. image 508) would include its own metadata 507. Indeed, a user such as developer 505 may provide input 506 that includes one or more images 508 that the user would like to add to the pool along with associated metadata 507. Any images uploaded by the developer 505 may be accessible by other users including group of users 510.

In some embodiments, the identifier 113 in FIG. 1 associated with a given visual asset may be a single identifier that represents multiple versions of that visual asset. In other words, the identifier 113 for visual asset 117 may be a single identifier that identifies multiple image representations 118. In such cases, the identifier 113 maps to the visual asset 117 which itself includes a collection of associated image representations 118. Each image representation may have its own usage metadata 121, and that usage metadata may be provided by users (e.g. developer 505 of FIG. 5). This metadata 121 may also be reusable for other visual assets. For instance, if a visual asset such as an icon had multiple image representations associated with it, the metadata associated with those image representations 118 may be usable with other icons if those icons had similar display characteristics.

In cases where metadata is provided, the metadata may be associated with and used with the visual asset 117. As such, the usage metadata 503 may be accessible when identifying appropriate visual assets. The set of visual assets is thereby extensible, allowing users such as developer 505 to provide their own image representations and add those image representations to specified visual assets. In this manner, the image providing service 105 can collect and aggregate images and makes them available to customers as needed or as requested.

Returning to FIG. 2, method 200 includes receiving a request that includes an identifier for one of the plurality of visual assets, and that includes one or more usage parameters (220). The request 112 from user 111 may be received by the communications module 104 of computer system 101. The request 112 may include identifier 113 and usage parameters 114. The evaluation module 107 of computer system 101 may evaluate the usage parameters 114 in conjunction with any associated usage metadata 121 to identify at least one image representation of the identified visual asset 117 that substantially corresponds with the usage parameters (230). The evaluation may take into account various characteristics of the image representation and the way in which it is to be displayed (as indicated by the usage parameters). The evaluation module 107 may then determine which image representation 118 best matches or best corresponds with the usage parameters.

The image representation 108 identified at this stage is indicated to the image obtaining module 109 which obtains the identified image representation of the corresponding visual asset based on the evaluation (240). The image providing module 110 then provides the identified image 115 to the user 111 (i.e. to a specified electronic device controlled by the user) in response to the request (250).

In some cases, the evaluation module 107 may determine that no visual asset substantially corresponds with (i.e. matches) the usage parameters. In such cases, the image providing service 105 may generate a visual asset 117 that substantially corresponds with the usage parameterization 114. For example, if the image providing service has an image collection 122 which contains several visual assets 117 for various DPI resolutions and backgrounds, but not one for a high contrast mode (or grayscale, etc.), the user can submit a request for a high contrast (or grayscale) version and the image providing service 105 would return a new asset by taking a best matched asset and passing it through a filter to meet the high contrast (or grayscale) requirement. The filter may include any type of imaging filter configured to refine an image according to one or more specified characteristics. The filtering functionality may be provided by the image providing service 105, or may be provided by a third party library or program.

In this manner, the image providing service may generate images dynamically, at runtime to more appropriately reply to a request for a visual asset with a given set of usage parameters. In other cases, rasterized versions of requested vector images may be cached to disk. Then, when those images are subsequently requested, the rasterized representation that was stored to the cache may be retrieved and used, as opposed to regenerating the vector image each time.

In some cases, the received usage parameters 114 may include an indication of user interface (UI) background that is being displayed by an application, a web page, an operating system or other software module). As such, the identified image representation 108 identified by the evaluation module 107 would substantially corresponds with or match the UI background in a way that is aesthetically pleasing and not distracting. In some cases, the received request 112 may include a wildcard parameter indicating that an appropriate image representation is to be identified for that parameter. The wildcard parameter may not indicate a specific setting or range for a given parameter, but may rather indicate that the image providing service is to look at the other usage parameters and find a setting for the wildcard parameter that matches or complements the other parameters. An image representation would then be identified using the decided-upon parameter.

Figure 4:
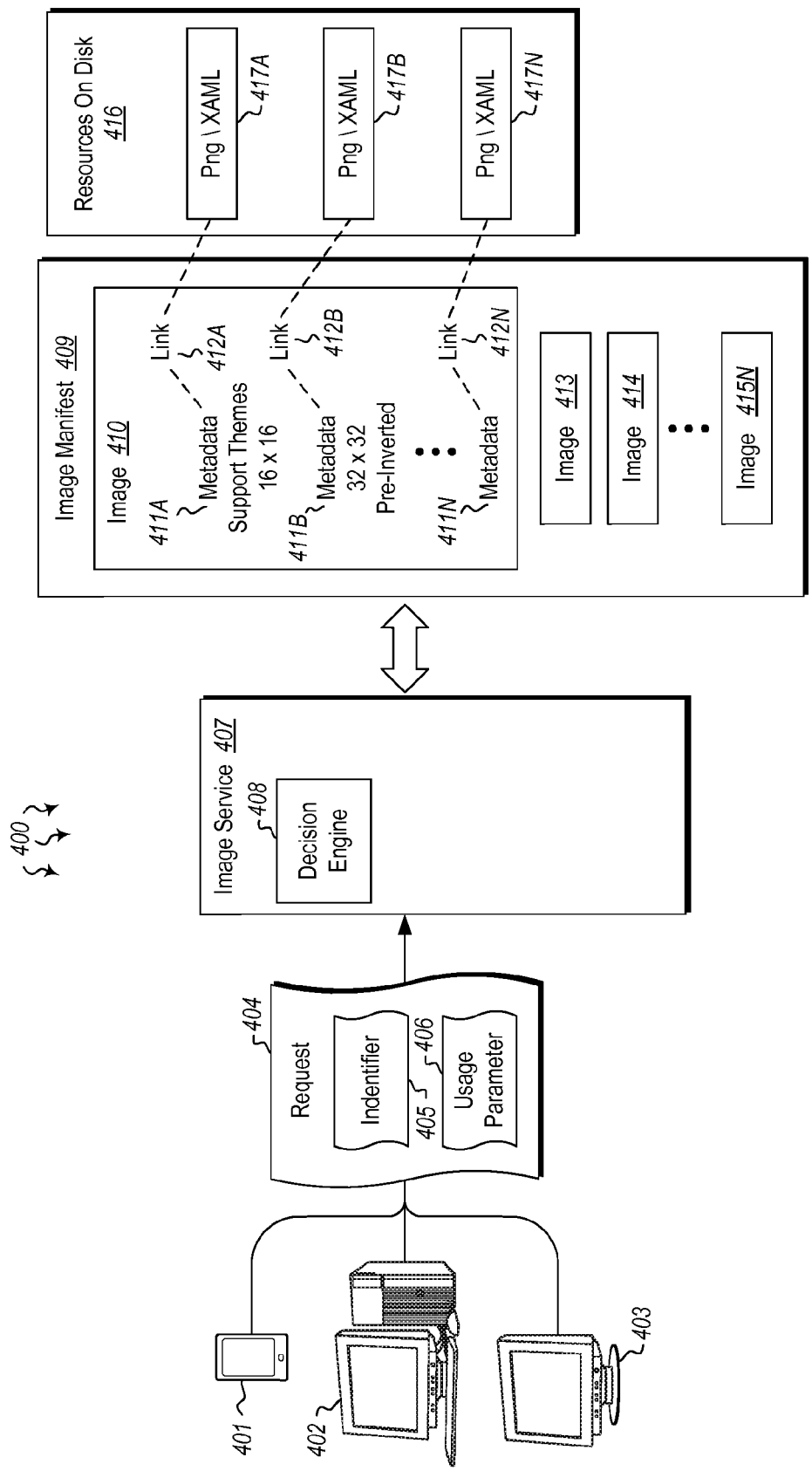
FIG. 4 illustrates an embodiment that includes an image service which receives image requests and finds appropriate images using one or more image manifests.

In some embodiments, as shown in FIG. 4, an image manifest may be used to provide links between image representations and actual image resources on disk. For example, an image service 407 may look at an image's metadata to determine its usage parameters. Image reference 410, for instance may include two or more portions of metadata. Metadata 411A may include a link 412A to Png or XAML file 417, and may indicate that image 417A supports themes and works best in a 16×16 display scenario. Metadata 411B, on the other hand, may include a link 412B to Png or XAML file 417B, and may indicate that image 417B is pre-inverted and is best displayed in a 32×32 scenario.

Substantially any number of metadata portions may be added to a given image (as indicated by link 412N linking metadata 411N and Png or XAML file 417N). Moreover, substantially any number of images may be referenced in the image manifest 409 (as shown by images 413, 414 and 415N). Each portion of metadata may link to an actual resource on disk 416. Although shown as Png/XAML files, it will be understood that these may be any types of vectorized or rasterized images, and it will be further understood that the link in the metadata may point to a remote location such as a cloud data store.

Each image catalog or image pool may have a single manifest or multiple manifests. Each manifest may reference many different images, or possibly just a single image. Moreover, each manifest may store developer-provided metadata or user-provided metadata for each image reference 410. The manifest may indicate a vectorized representation and/or a rasterized representation for each visual asset. The image service 407 may implement a decision engine 408 to scale up the generated image using vectors based on current context. For example, a request 404 coming from a smart phone 401, a personal computer 402 or a television 403 may include an identifier 405 and one or more usage parameters 406. The usage parameters may provide context indicating the size of the display, its display density, contrast and brightness settings or other information that could help the decision engine 408 in making a determination as to which image on disk is the best fit for the given display device.

In some cases, the metadata format may be used to define an image list from a collection of other images in the metadata file. This may allow a user to request a collection of images in a single request. For instance, a user could provide a string of identifiers that were combined together in a single request. In this manner, a user may be able to request multiple context-specific images at the same time using the same request 404.

Turning now to FIG. 3, a flowchart is provided of a method 300 for requesting an image for a specified context. The method 300 will now be described with frequent reference to the components and data of environment 100.

Method 300 includes generating a request that includes an identifier for one of a plurality of visual assets, the request further including one or more usage parameters indicating one or more characteristics of an environment in which the visual asset will be presented (310). A computing system implemented by user 111 may generate request 112 that includes an identifier 113 for a visual asset 117 and one or more usage parameters 114 that indicate characteristics of the display device on which the visual asset 117 will be displayed. The computing device may be a smart phone, tablet, wearable device or other type of electronic device.

The computing device then transmits the generated request to an image providing service 105. The image providing service may be configured to store multiple image representations 118 of the corresponding visual asset 117 identified by the identifier 113. The image representations 118 may include a vectorized representation 119 of the visual asset or a rasterized representation 120 of the visual asset (320). Then, upon the imaging service 105 identifying at least one image representation 118 of the corresponding visual asset 117 that substantially corresponds with the usage parameters 114, the computing device receives the identified image representation from the imaging service (330). The computing device may then display the received image representation on its display.

In some cases, the computing system may upload images to the image providing service (as generally shown in FIG. 5). As the images are uploaded from user 111 and other users, the image providing service 105 may be configured to aggregate the images and provide the images to other users. Thus, the images 122 stored in the data store 116 may be continually growing as users add images. Moreover, users may add metadata to the existing images, indicating scenarios in which the particular image representation is a good fit. In some cases, the image providing service 105 may make contextual adjustments to the received image representation's metadata based on an environment in which the received image representation is to be displayed.

For example, if the image representation is to be displayed against a dark or a light background, this may be indicated in the image's associated metadata. The image providing service 105 may support multiple different image rendering technologies including WinForms and HTML. This may allow a user to provide an indication of which rendering technologies are available on the computing device in the usage parameters 114. In cases where no image representation is determined to be a good match based on the usage parameters, the image providing service may be configured to use a vectorized representation as a default. In other cases, if, for example, an appropriately sized image cannot be found, the image providing service may attempt to scale up an existing image. The final size of the image may be computed based on the pixel density of the display. This allow the same physical size to be maintained on the screen. In this manner, users may provide a general indication of which image to use, and the image providing service will select the most appropriate version of that image to display on the device for which usage parameters were provided.

Claims support: In one embodiment, a method is described for providing an image in response to a request for an image. The method includes the following: for each of a plurality of visual assets 117, each having an identifier 113, performing the following against an unknown set of visual assets: storing a plurality of image representations 118 of the corresponding visual asset identified by the identifier, the plurality of image representations including at least a vectorized representation 119 of the visual asset or a rasterized representation 120 of the visual asset, receiving a request 112 that includes an identifier 113 for one of the plurality of visual assets, and that includes usage parameters 114, evaluating at least one of the usage parameters to identify at least one image representation of the identified visual asset that substantially corresponds with the usage parameters, obtaining the identified image representation 115 of the corresponding visual asset based on the evaluation, and providing the obtained image representation in response to the request.

The method further includes determining that no visual asset substantially corresponds with the usage parameters and generating a visual asset that substantially corresponds with the usage parameterization. Usage metadata is evaluated in conjunction with the usage parameters to identify at least one image representation of the identified visual asset that substantially corresponds with the usage parameters, where the usage metadata includes contrast, size, brightness or pixel density. The received usage parameters includes an indication of user interface (UI) background, such that the identified image representation of the corresponding visual asset substantially corresponds with the UI background. In some cases, the received request includes a wildcard parameter indicating that an appropriate image representation is to be identified for that parameter. The image representations also include an extensible catalog of image representations. The extensible catalog of image representations is added at runtime and is queryable.

In another embodiment, a computer program product is provided for implementing a method for requesting an image for a specified context. The computer program product includes computer-readable storage media having stored thereon computer-executable instructions that, when executed by one or more processors of a computing system, cause the computing system to perform the method, where the method includes: generating a request 112 that includes an identifier 113 for one of a plurality of visual assets 117, the request further including one or more usage parameters 114 indicating one or more characteristics of an environment in which the visual asset will be presented, transmitting the generated request to an image providing service 105, the image providing service being configured to store a plurality of image representations 118 of the corresponding visual asset identified by the identifier, the plurality of image representations including at least a vectorized representation 119 of the visual asset or a rasterized representation 120 of the visual asset and, upon the imaging service identifying at least one image representation of the corresponding visual asset that substantially corresponds with the usage parameters, receiving the identified image representation 115 from the image providing service.

The method further includes uploading images to the image providing service, the image providing service being configured to aggregate images and provide images from a plurality of users. The method also includes making contextual adjustments to the received image representation's metadata based on an environment in which the received image representation is to be displayed.

A computer system comprising the following: one or more processors, a data storing module 106 for storing a plurality of image representations 118 of the corresponding visual asset 117 identified by the identifier 113, the plurality of image representations including at least a vectorized representation 119 of the visual asset or a rasterized representation 120 of the visual asset, a communications module 104 for receiving a request 112 that includes an identifier 113 for one of the plurality of visual assets, and that includes one or more usage parameters 114, an evaluation module 107 for evaluating at least one of the one or more usage parameters to identify an image representation of the identified visual asset that substantially corresponds with the usage parameters, a determining module 408 for determining that no visual asset substantially corresponds with the usage parameters, a generating module 109 for generating a visual asset that substantially corresponds with the usage parameterization, and an image providing module 110 for providing the generated image representation in response to the request.

The computer system uses the metadata format to define an image list from a collection of other images in the metadata file, allowing a user to request a collection of images in a single request. A manifest indicates a vector format for each image size. A decision engine scales up the generated image using vectors based on current context. The unknown set of visual assets is extensible, allowing users to provide their own image representations and add those image representations to a specified visual asset.

Accordingly, methods, systems and computer program products are provided which provide an image in response to a request for an image. Moreover, methods, systems and computer program products are provided which request an image for a specified context.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method for providing an image in response to a request for an image, the method comprising:
   for each of a plurality of visual assets, each having an identifier, performing the following against an unknown set of visual assets:
      storing a plurality of image representations of the corresponding visual asset identified by the identifier, the plurality of image representations including at least a vectorized representation of the visual asset or a rasterized representation of the visual asset;
      receiving a request that includes an identifier for one of the plurality of visual assets, and that includes one or more usage parameters;
      evaluating at least one of the one or more usage parameters to identify at least one image representation of the identified visual asset that substantially corresponds with the usage parameters;
      obtaining the identified image representation of the corresponding visual asset based on the evaluation; and
      providing the obtained image representation in response to the request.

2. The method of claim 1, wherein the plurality of image representations comprises an extensible catalog of image representations.

3. The method of claim 2, wherein the extensible catalog of image representations is added at runtime and is queryable.

4. The method of claim 1, further comprising:
   determining that no visual asset substantially corresponds with the usage parameters; and
   generating a visual asset that substantially corresponds with the usage parameterization.

5. The method of claim 1, wherein usage metadata is evaluated in conjunction with the one or more usage parameters to identify at least one image representation of the identified visual asset that substantially corresponds with the usage parameters, the usage metadata comprising at least one of contrast, size, brightness and pixel density.

6. The method of claim 1, wherein the received usage parameters include an indication of user interface (UI) background, such that the identified image representation of the corresponding visual asset substantially corresponds with the UI background.

7. The method of claim 1, wherein the received request includes at least one wildcard parameter indicating that an appropriate image representation is to be identified for that parameter.

8. The method of claim 1, wherein at least one of the image representations includes usage metadata indicating suitability for use with a specified background.

9. The method of claim 1, wherein the identifier for the plurality of visual assets comprises a single identifier representing multiple versions of the visual assets.

10. The method of claim 1, wherein users write usage metadata for their own visual assets, the metadata being reusable for other visual assets.

11. The method of claim 10, wherein images uploaded to an image pool include one or more portions of usage metadata associated with the visual asset, such that the usage metadata is accessible when identifying appropriate visual assets.

12. A computer system comprising the following:
   one or more processors;
   one or more computer-readable storage media having stored thereon computer-executable instructions that, when executed by the one or more processors, cause the computing system to perform a method for providing an image in response to a request for an image, the method comprising the following:

for each of a plurality of visual assets, each having an identifier, performing the following against an unknown set of visual assets:
- storing a plurality of image representations of the corresponding visual asset identified by the identifier, the plurality of image representations including at least a vectorized representation of the visual asset or a rasterized representation of the visual asset;
- receiving a request that includes an identifier for one of the plurality of visual assets, and that includes one or more usage parameters;
- evaluating at least one of the one or more usage parameters to identify an image representation of the identified visual asset that substantially corresponds with the usage parameters;
- determining that no visual asset substantially corresponds with the usage parameters;
- generating a visual asset that substantially corresponds with the usage parameterization; and
- providing the generated image representation in response to the request.

13. The computer system of claim 12, wherein a manifest indicates a vector format for each image size.

14. The computer system of claim 12, wherein a decision engine scales up the generated image using vectors based on current context.

15. The computer system of claim of claim 12, further comprising using the metadata format to define an image list from a collection of other images in the metadata file, allowing a user to request a collection of images in a single request.

16. The computer system of claim of claim 12, wherein the unknown set of visual assets is extensible, allowing users to provide their own image representations and add those image representations to a specified visual asset.

* * * * *